United States Patent
Shima et al.

(10) Patent No.: US 9,552,948 B2
(45) Date of Patent: Jan. 24, 2017

(54) SEALED CONTACT DEVICE AND METHOD OF MANUFACTURING THE SAME

(71) Applicant: OMRON Corporation, Kyoto-shi, Kyoto (JP)

(72) Inventors: Hiromi Shima, Kumamoto (JP); Masaki Mori, Kumamoto (JP); Takuma Okamoto, Kumamoto (JP)

(73) Assignee: OMRON Corporation, Kyoto (JP)

( * ) Notice: Subject to any disclaimer, the term of this patent is extended or adjusted under 35 U.S.C. 154(b) by 139 days.

(21) Appl. No.: 14/426,657

(22) PCT Filed: Aug. 8, 2014

(86) PCT No.: PCT/JP2014/071068
§ 371 (c)(1),
(2) Date: Mar. 6, 2015

(87) PCT Pub. No.: WO2015/136730
PCT Pub. Date: Sep. 17, 2015

(65) Prior Publication Data
US 2016/0260563 A1      Sep. 8, 2016

(30) Foreign Application Priority Data
Mar. 14, 2014   (JP) .................................. 2014-052495

(51) Int. Cl.
*H01H 9/02*       (2006.01)
*H01H 50/02*      (2006.01)
(Continued)

(52) U.S. Cl.
CPC ........... *H01H 50/023* (2013.01); *H01H 49/00* (2013.01); *H01H 50/026* (2013.01);
(Continued)

(58) Field of Classification Search
CPC .... H01H 49/00; H01H 50/023; H01H 50/026; H01H 51/065; H01H 50/548; H01H 2223/002; H01H 2223/008
(Continued)

(56) References Cited

U.S. PATENT DOCUMENTS

| | | |
|---|---|---|
| 2013/0057369 A1 | 3/2013 | Yano et al. |
| 2014/0013583 A1 | 1/2014 | Naka et al. |

FOREIGN PATENT DOCUMENTS

| | | |
|---|---|---|
| JP | 6-31456 A | 2/1994 |
| JP | 2002-075108 A | 3/2002 |

(Continued)

OTHER PUBLICATIONS

International Search Report issued in corresponding application PCT/JP2014/071068, mailed Oct. 7, 2014 (4 pages).
(Continued)

*Primary Examiner* — Ramon M Barrera
(74) *Attorney, Agent, or Firm* — Osha Liang LLP (57) ABSTRACT

A sealed contact device having a small number of components and high productivity. In the sealed contact device a ring-shaped flange portion extending laterally from a lower opening edge part of a metallic case is welded and integrated with an upper surface of a plate-shaped yoke to form an internal space and a stationary contact and a moving contact are opposed to each other in the internal space so as to enable approach/separation. A ring-shaped projection provided along a lower surface of the ring-shaped flange portion is integrated with the upper surface of the plate-shaped yoke by resistance welding.

7 Claims, 12 Drawing Sheets

(51) Int. Cl.
*H01H 49/00* (2006.01)
*H01H 50/54* (2006.01)
*H01H 51/06* (2006.01)

(52) U.S. Cl.
CPC ......... *H01H 50/548* (2013.01); *H01H 51/065* (2013.01); *H01H 2223/002* (2013.01); *H01H 2223/008* (2013.01)

(58) Field of Classification Search
USPC ........................................................ 335/202
See application file for complete search history.

(56) References Cited

FOREIGN PATENT DOCUMENTS

| | | | |
|---|---|---|---|
| KR | 2012-0130228 A | 11/2012 | |
| WO | 2012-157175 A1 | 11/2012 | |

OTHER PUBLICATIONS

Written Opinion issued in corresponding application PCT/JP2014/071068, mailed Oct. 7, 2014 (5 pages).
Office Action issued in corresponding Korean Application No. 10-2015-7005196, mailed on Jul. 19, 2016 (5 pages).

SEALED CONTACT DEVICE AND METHOD OF MANUFACTURING THE SAME

TECHNICAL FIELD

The present invention relates to a sealed contact device and more particularly to a sealed structure thereof.

BACKGROUND ART

A conventional sealed contact device is disclosed, for example, which includes a contact component 100 having a stationary contact and a moving contact disposed in an internal space which formed by welding/integrating a flange portion 22 extending laterally from a lower opening edge part of a metal cap 20 with an outer peripheral frame portion 14 on an upper surface of a metal base 10 (see Patent Document 1). In particular, when using a resistance welding technique, a projection 16 provided on an upper surface of the outer peripheral frame portion 14 is bonded to the flange portion 22 of the metal cap 20 and then integrated by means of the resistance welding.

PRIOR ART DOCUMENT

Patent Document

Patent Document 1: JP 2002-75108 A

SUMMARY OF THE INVENTION

However, the sealed contact device has such a structure that the outer peripheral frame portion 14 is sandwiched between the metal base 10 and the metal cap 20, which causes a problem that the number of components is increased and the yield production is limited.

One or more embodiments of the present invention provides a sealed contact device, in which the number of components is decreased and the yield production is enhanced.

A sealed contact device according to one or more embodiments of the present invention has a structure in which a ring-shaped flange portion extending laterally from a lower opening edge part of a metallic case is welded and integrated with an upper surface of a plate-shaped yoke to form an internal space and a stationary contact and a moving contact are opposed to each other in the internal space so as to enable connection/disconnection, and a ring-shaped projection provided along a lower surface of the ring-shaped flange portion is integrated with the upper surface of the plate-shaped yoke by resistance welding.

According to one or more embodiments of the present invention, the metallic case is directly welded and integrated with the plate-shaped yoke. Therefore, it is possible to provide a sealed contact device having a small number of components and high productivity.

According to one or more embodiments of the present invention, the ring-shaped projection may be formed by beating process in two directions.

According to one or more embodiments of the present invention, the ring-shaped projection can be produced at small processing cost, thereby providing a sealed contact device having much higher productivity.

According to one or more embodiments of the present invention, the ring-shaped projection may be formed by a knocking process.

According to one or more embodiments, a wide range of production methods can be adapted.

According to one or more embodiments of the present invention, there may be provided the ring-shaped projection which does not come in contact with a cut-out portion disposed on an outer peripheral edge part of the ring-shaped flange portion.

According to one or more embodiments, even if the ring-shaped projection is molten by resistance welding, a discontinuous region is not present in a welded part. Therefore, it is possible to obtain a sealed contact device which is excellent in airtightness.

According to one or more embodiments of the present invention, the ring-shaped projections provided on two adjacent sides of the ring-shaped flange portion may be coupled like a circular arc in a region provided with the cut-out portion.

According to one or more embodiments, also in the case in which an internal pressure is raised after the welding, it does not concentrate in one place so that an airtight leakage does not occur.

According to one or more embodiments of the present invention, a surface provided with the ring-shaped projection of the ring-shaped flange portion and a surface on an opposite side may have inclination angles of the ring-shaped flange portion to the plate-shaped yoke determined in such a manner that the plate-shaped yoke and the metallic case do not come in contact with each other in a place other than the ring-shaped projection.

According to one or more embodiments, it is possible to reliably weld the ring-shaped projection of the metallic case to the plate-shaped yoke, thereby obtaining a reliable sealed contact device.

In a method of manufacturing a sealed contact device according to one or more embodiments of the present invention in which a ring-shaped flange portion extending laterally from a lower opening edge part of a metallic case is welded and integrated with an upper surface of a plate-shaped yoke to form an internal space and a stationary contact and a moving contact are opposed to each other in the internal space so as to enable connection/disconnection, a ring-shaped projection provided along a lower surface of the ring-shaped flange portion is integrated with the upper surface of the plate-shaped yoke by resistance welding.

According to one or more embodiments of the present invention, the metallic case is directly welded and integrated with the plate-shaped yoke. Therefore, there is an advantage that a sealed contact device having high productivity can be obtained.

BRIEF DESCRIPTION OF THE DRAWINGS

FIG. 10A is a perspective view showing an arc shield member illustrated in FIG. 1, and FIGS. 10B and 10C are perspective views showing shield members for an arc according to one or more embodiments of the present invention.

DETAILED DESCRIPTION

Embodiments in which a sealed contact device according to the present invention is applied to a hermetically sealed electromagnetic relay will be described with reference to the accompanying drawings of FIGS. 1 to 12.

Figure 6:
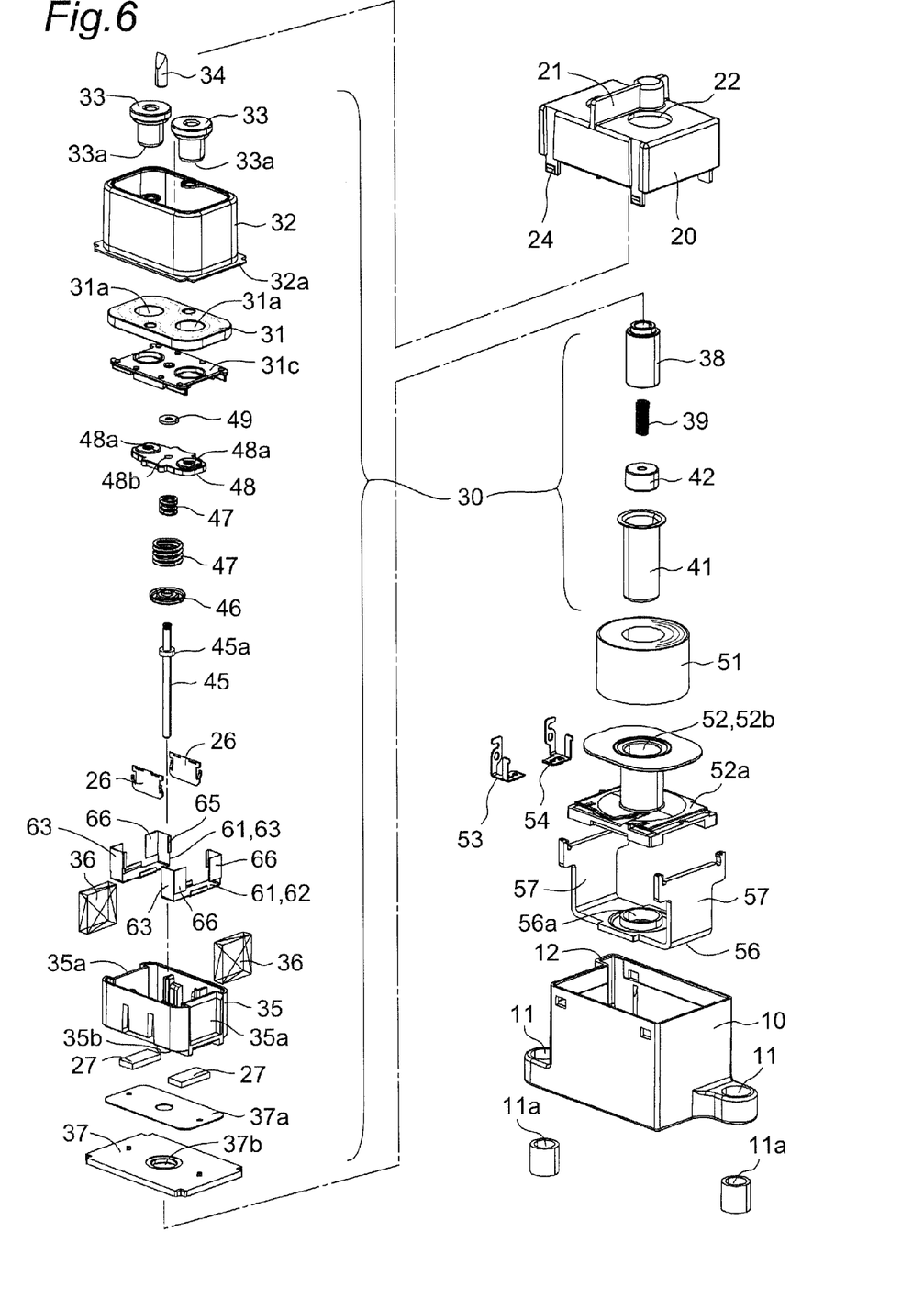
FIG. 6 is an exploded perspective view showing the sealed contact device illustrated in FIG. 1A according to one or more embodiments of the present invention.
Figure 7:
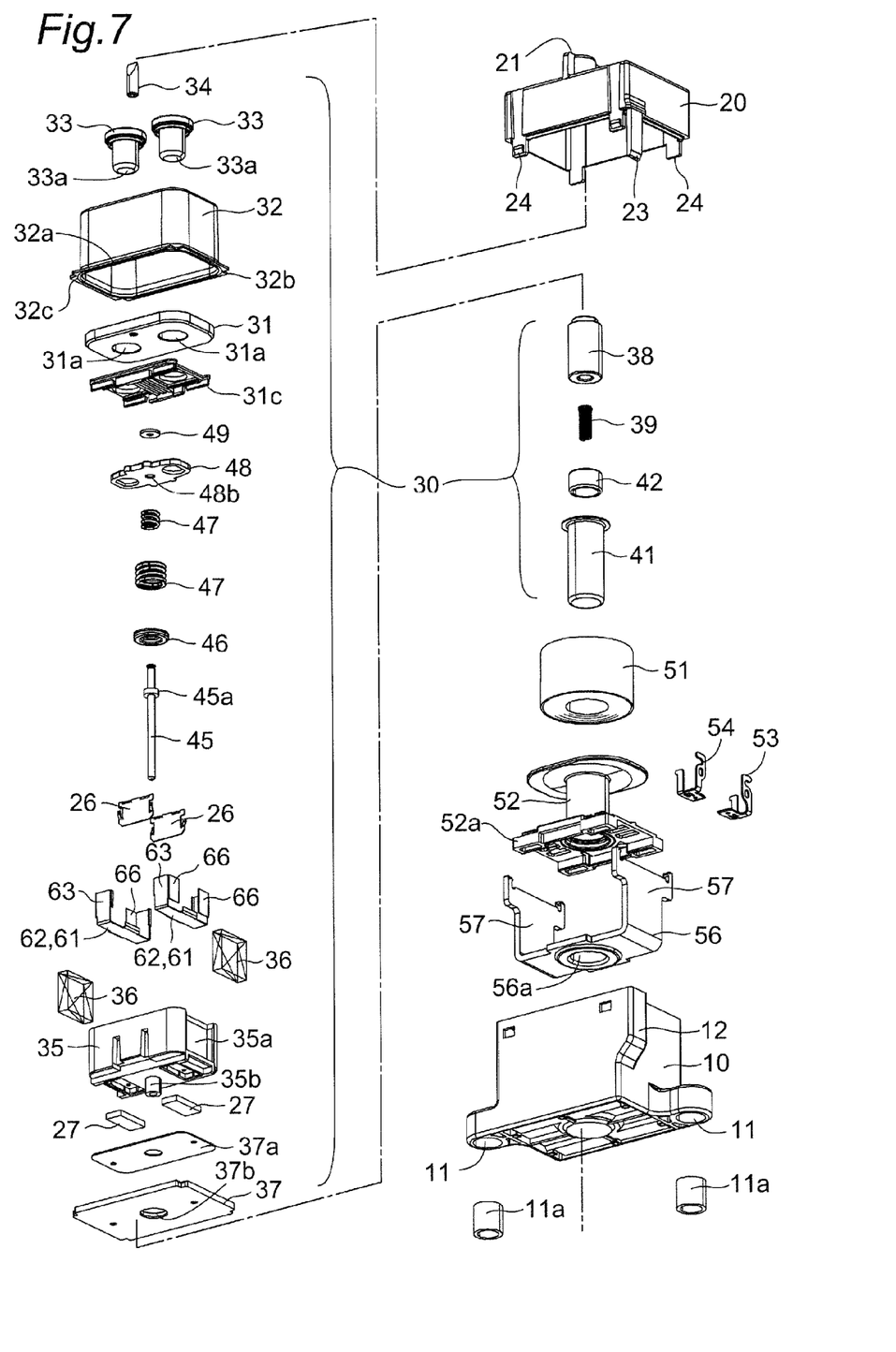
FIG. 7 is an exploded perspective view showing the sealed contact device illustrated in FIG. 1B according to one or more embodiments of the present invention.

Referring to a sealing type electromagnetic relay according to one or more embodiments, as shown in FIGS. 1 to 10, particularly, FIGS. 6 and 7, a contact mechanism portion 30 and an electromagnet portion 50 for driving the contact mechanism portion 30 from an outside of a sealed space 43 are accommodated in a housing formed by assembling a cover 20 into a case 10. The contact mechanism portion 30 is assembled into the sealed space 43 including a ceramic plate 31, a metallic cylindrical flange 32, a plate-shaped first yoke 37 and a bottom-closed cylindrical member 41.

The case 10 is a resin molded product which is almost box-shaped. Also the case is provided on an outside surface at lower corner parts with attaching holes 11 each having mounting fittings 11a press fitted therein, and also provided one side surface with a bulged portion 12 for pulling out a lead wire (not shown) and on the opposite side at an opening edge part with engaging holes 13.

The cover 20 takes a planar shape capable of covering an opening portion of the case 10, and furthermore, terminal holes 22 and 22 are provided on both sides of a partition wall 21 protruding from a center of an upper surface thereof. Moreover, the cover 20 has a protruding portion 23 provided on one side surface thereof. The protruding portion 23 can prevent so-called flapping of the lead wire (not shown) by insertion into the bulged portion 12 of the case 10. Furthermore, the cover 20 has an engaging click portion 24 provided on the opening edge part of the opposed side surface. The engaging click portion 24 can be engaged with the engaging hole 13 of the case 10.

The contact mechanism portion 30 is disposed in the sealed space 43 defined by the ceramic plate 31, the metallic cylindrical flange 32, the plate-shaped first yoke 37 and the bottomed cylindrical member 41 (see FIG. 2) as described above, and includes a magnet holder 35, a cylindrical stationary iron core 38, a moving iron core 42, a moving shaft 45 and a moving contact piece 48.

The ceramic plate 31 takes a planar shape which can be brazed to an upper opening edge part of the metallic cylindrical flange 32 as will be described below, which is provided with a pair of terminal holes 31a and 31a, and is used in combination with an auxiliary plate 31c. Moreover, the ceramic plate 31 has a metal layer (not shown) formed on an outer peripheral edge part of an upper surface thereof and an opening edge part of the terminal hole 31a. As shown in FIG. 6, a stationary contact terminal 33 is brazed to the terminal hole 31a of the ceramic plate 31. The stationary contact terminal 33 has a stationary contact 33a fixed to a lower end.

Figure 8A:
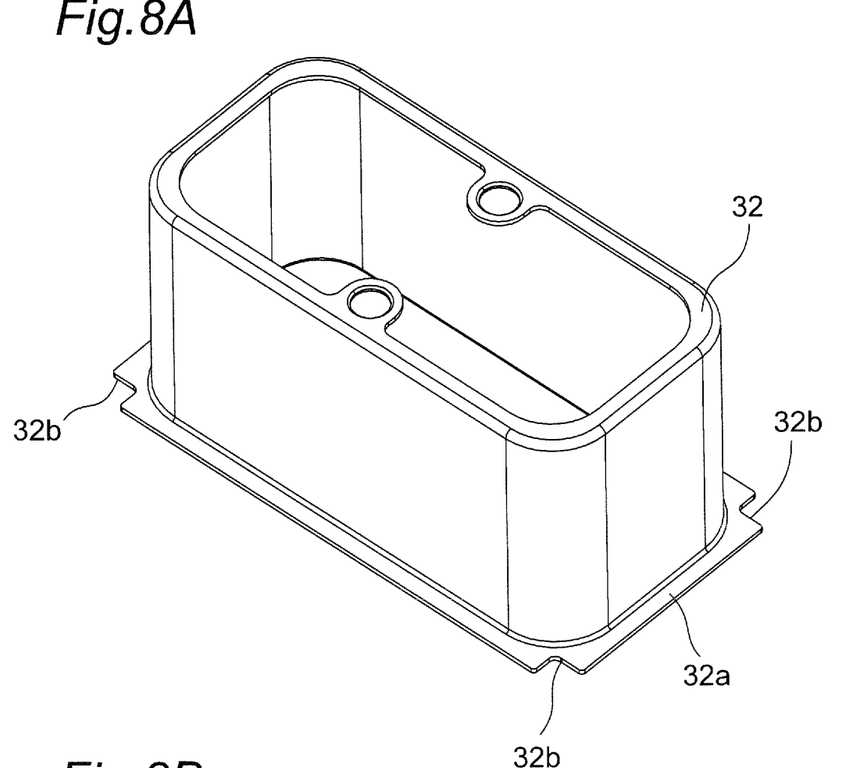
FIGS. 8A and 8B are perspective views showing a metallic cylindrical flange and a first yoke illustrated in FIG. 6, respectively according to one or more embodiments of the present invention.
Figure 9A:
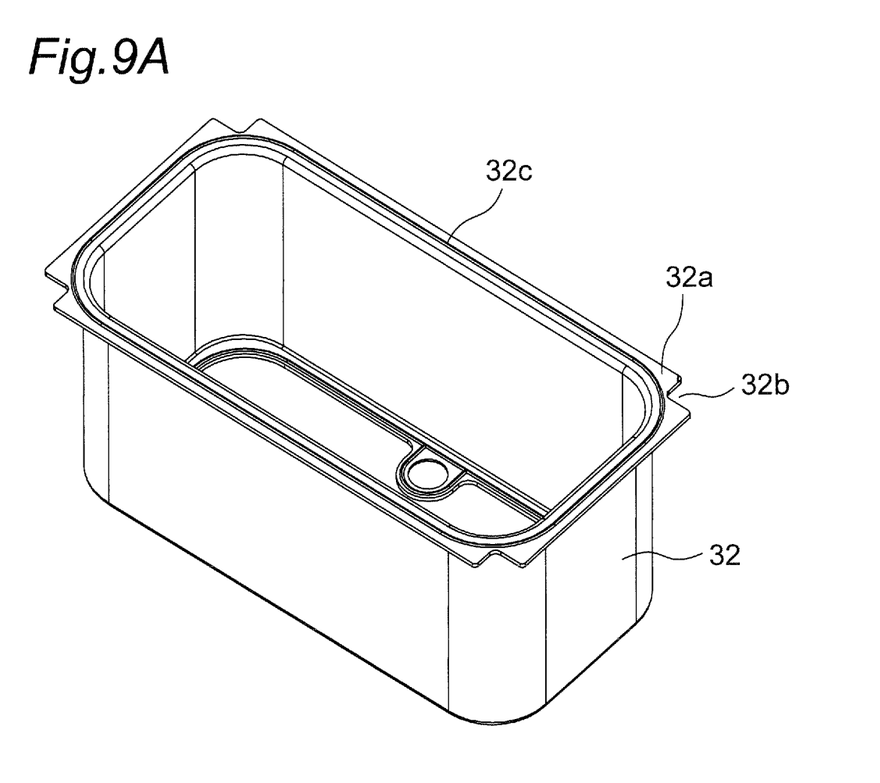
FIGS. 9A and 9B are a perspective view and a partial enlarged sectional view showing the metallic cylindrical flange illustrated in FIG. 6, respectively, as seen at a different angle according to one or more embodiments of the present invention.
Figure 9B:
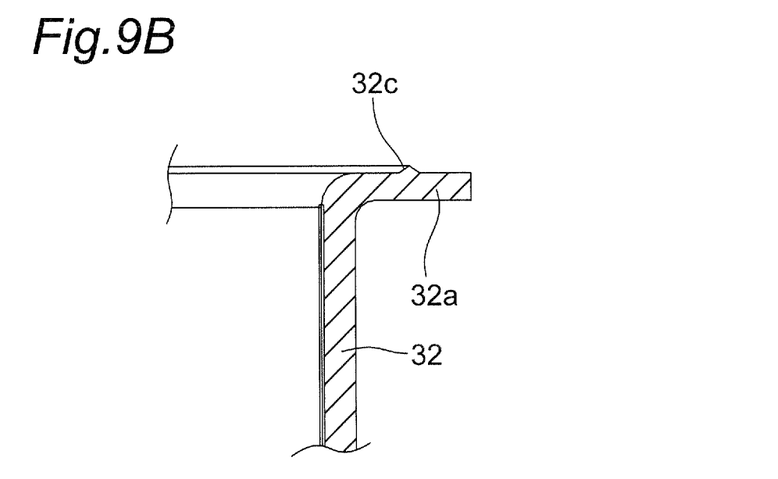

As shown in FIG. 8, the metallic cylindrical flange 32 to be welded and integrated with an outer peripheral edge part on an upper surface of the ceramic plate 31 takes an almost cylindrical shape obtained by forming a metal plate through a press process. In the metallic cylindrical flange 32, particularly, a ring-shaped flange portion 32a extends laterally from a lower opening edge part thereof and a cut-out portion 32b is formed at corner parts of the ring-shaped flange portion 32a. In the metallic cylindrical flange 32, a ring-shaped projection 32c is formed along a lower surface of the ring-shaped flange portion 32a by performing a panel beating process on the ring-shaped flange portion 32a twice from side to side as shown in FIG. 9. The ring-shaped projection 32c may be formed by a knocking process on the ring-shaped flange portion 32a.

The metallic cylindrical flange 32 is integrated with an upper surface of the plate-shaped first yoke 37 (which will be described below) by resistance welding through the ring-shaped projection 32c provided on the ring-shaped flange portion 32a. However, the ring-shaped projection 32c is formed in a remote position spaced away from the cut-out portion so that poor or improper welding can be avoided in the resistance welding process.

An inclination angle of the ring-shaped flange portion 32a to the upper surface of the first yoke 37 has an angle range determined in such a manner that in the resistance welding, the ring-shaped projection 32c is pressurized uniformly and stably and that the first yoke 37 comes in contact with the metallic cylindrical flange 32 only at the ring-shaped projection 32c.

Furthermore, an apex angle of the ring-shaped projection 32c may be 60 to 80 degrees, for example, 70 degrees. This is because if the apex angle is smaller than 60 degrees, it is difficult to form the ring-shaped projection 32c, and if the apex angle is greater than 80 degrees, a height of the ring-shaped projection 32c may likely be varied, causing a problem for achieving the uniform resistance welding.

Moreover, the ring-shaped projection 32c is disposed at such a position close to but spaced away from the cut-out portion 32b, and two portions of the ring-shaped projection 32c on adjacent sides of the ring-shaped flange portion 32a are connected in an arc-like configuration. This avoids poor or improper welding and secures reliable welding in the resistance welding process, even when there is a small distance from an end of the ring-shaped flange portion 32a to the ring-shaped projection 32c. Furthermore, since the ring-shaped projection 32c is formed continuously in an arc-like configuration at the corners, the metallic cylindrical flange 32 can be hermetically sealed without the pressure being focused on a particular point, even when the internal pressure thereof is raised after the welding process.

The ring-shaped projection 32c is provided on the ring-shaped flange portion 32a of the metallic cylindrical flange 32 which is thinner than the first yoke 37, and therefore, it is possible to reduce a processing energy in the formation of the ring-shaped projection 32c. If the ring-shaped projection is to be formed on the thick first yoke 37, for example, by, a panel beating process or a knocking process, greater processing energy is required for forming the ring-shaped projection 32c, and thus larger production facilities are necessary to be built. Such problems can be solved by providing the ring-shaped projection 32c on the thin metallic cylindrical flange 32 according to one or more embodiments.

The magnet holder 35 to be accommodated in the metallic cylindrical flange 32 is formed by a heat-resistant insulating material taking a shape of a box, and has a pocket groove 35a formed on outside surfaces at both opposed ends. The pocket groove 35a can hold a permanent magnet 36. Moreover, the magnet holder 35 has a ring-shaped receiving table 35c provided on a center of a bottom surface so as to be lower by one step (see FIG. 2), and furthermore, has a cylindrical insulating portion 35b protruding toward a lower side from a center of the ring-shaped receiving table 35c. Even if an arc is generated when a voltage is raised along a path through the metallic cylindrical flange 32, the plate-shaped first yoke 37 and the cylindrical stationary iron core 38, the cylindrical insulating portion 35b insulates the cylindrical stationary iron core 38 and the moving shaft 45 from each other, thereby preventing their welding integration. Furthermore, the positioning plate 26 is disposed to abut on the moving contact piece 48 opposite to an inner part of the magnet holder 35 and rotation of the moving contact piece 48 is prevented so as to position the moving contact piece 48. A pair of rubber plates 27 is disposed between the magnet holder 35 and the first yoke 37 to absorb a shock generated between the magnet holder 35 and the ring-shaped flange portion 45a when the stationary contact 33a is spaced away from the moving contact 48a.

Moreover, an arc shield member 61 according to one or more embodiments of the present invention is provided in the magnet holder 35. The arc shield member 61 is formed of a metal such as stainless, for example, and is formed to have a substantially U-shaped section as shown in FIG. 10A.

Figure 4A:
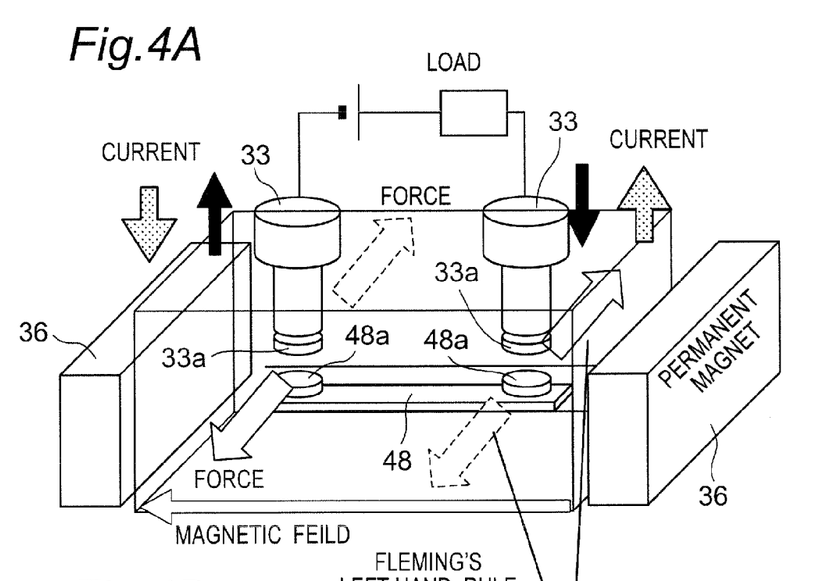
FIG. 4A is a schematic perspective view for illustrating a method for dissipating an arc and FIG. 4B is a partial plan sectional view showing the sealed contact device according to one or more embodiments of the present invention.
Figure 4B:
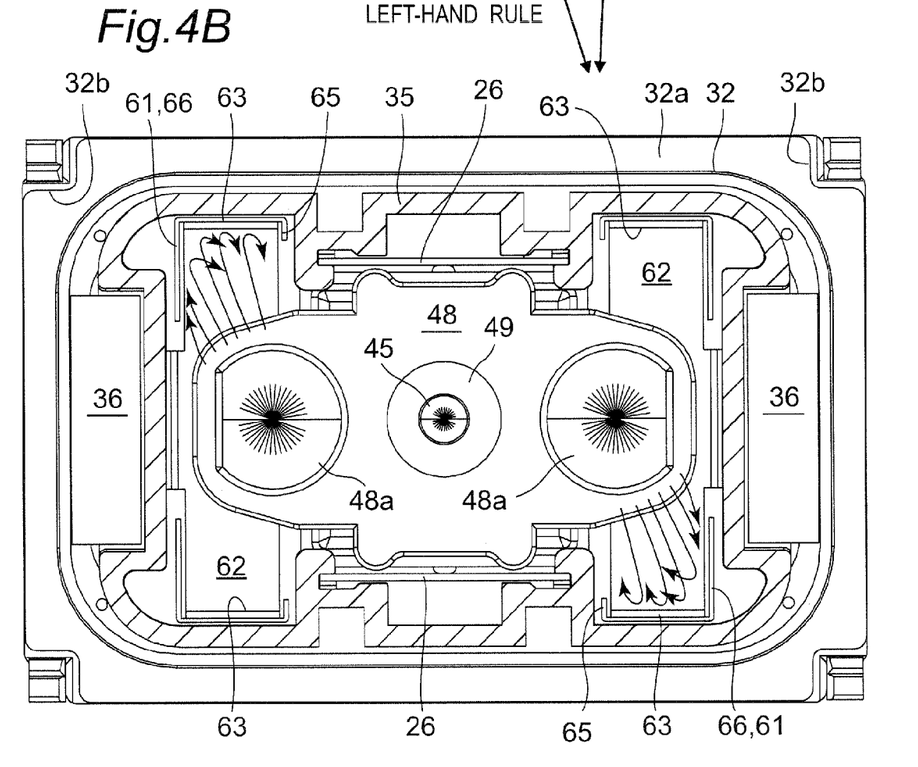
Figure 5A:
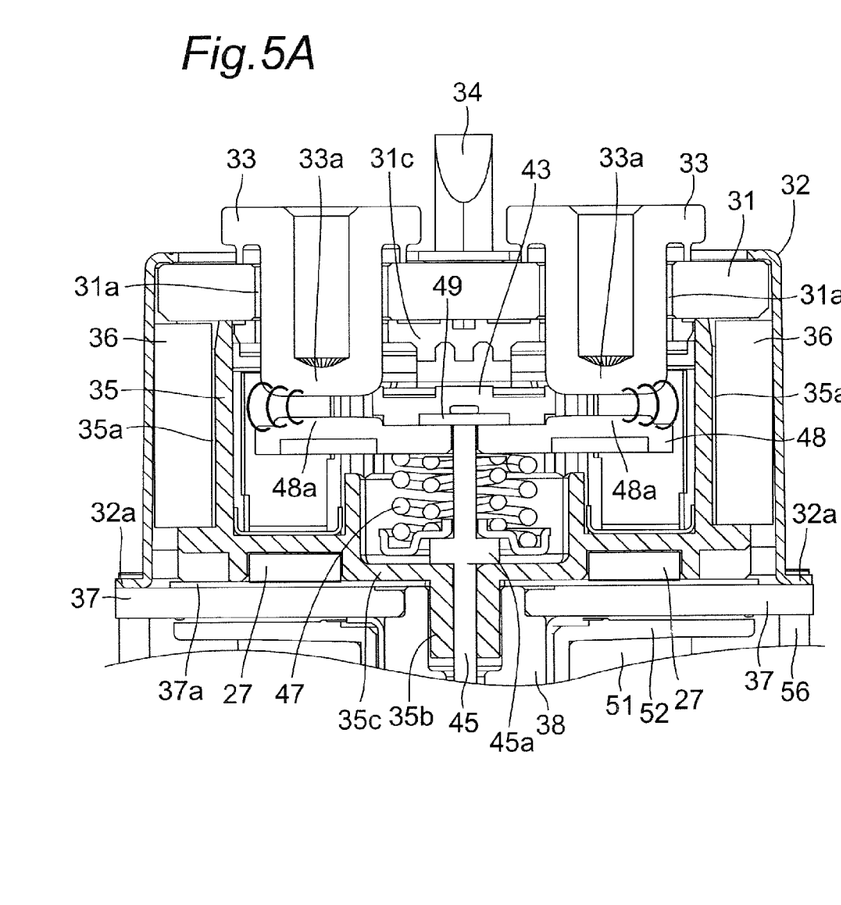
FIGS. 5A and 5B are a partial front sectional view and a partial side sectional view showing the sealed contact device, respectively, for illustrating the method for dissipating an arc according to one or more embodiments of the present invention.
Figure 5B:
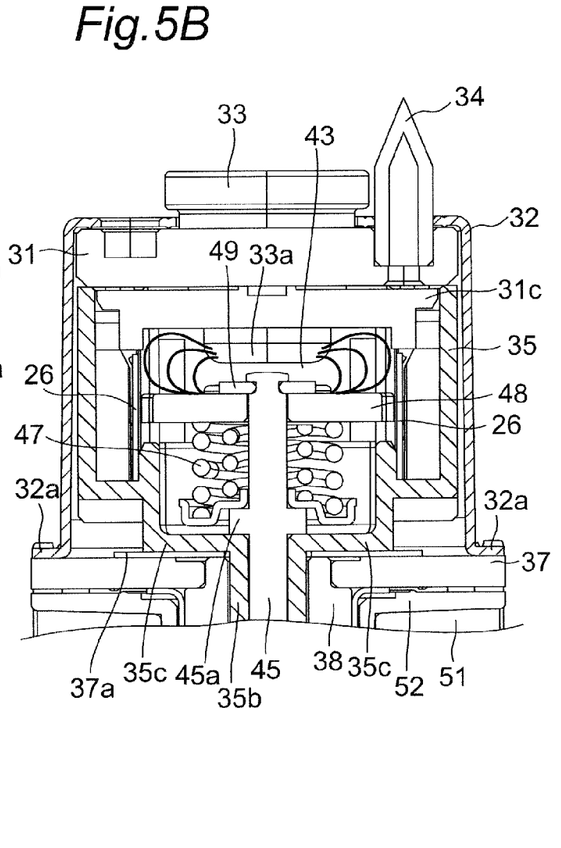
Figures 10A, 10B:
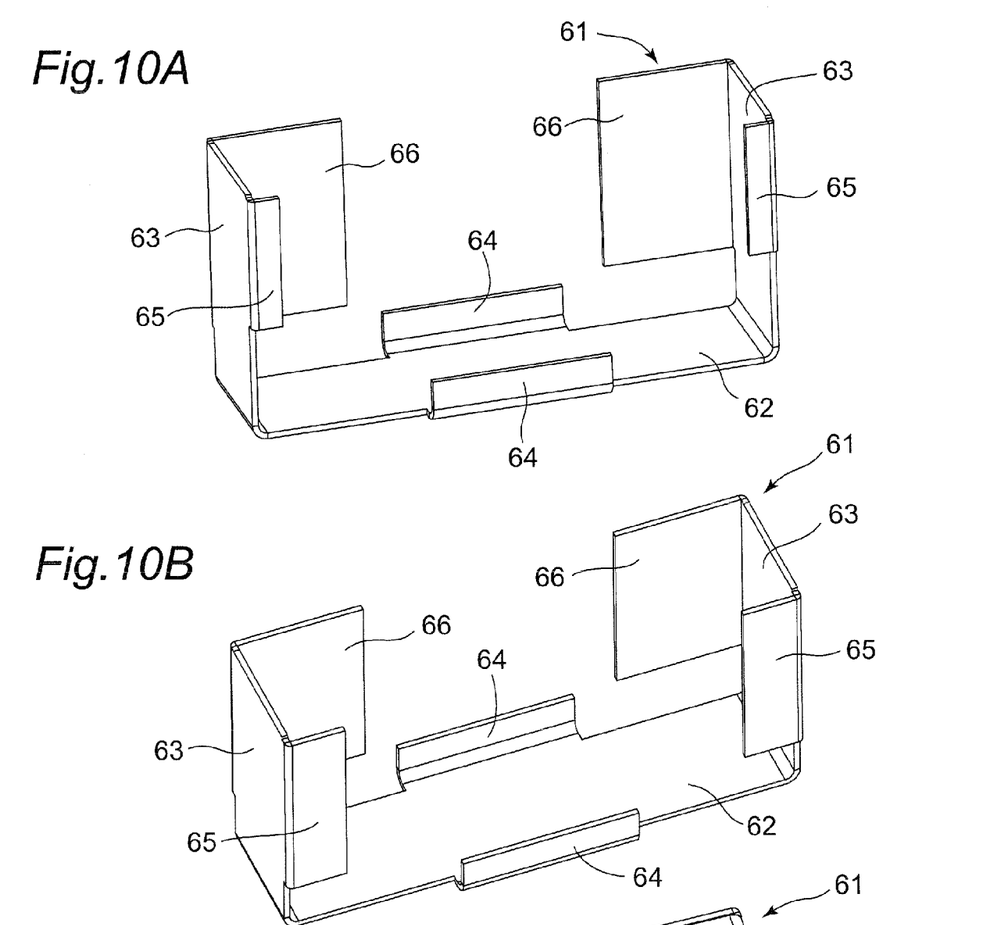

In other words, the arc shield member 61 includes a plate-shaped coupling member 62 and a pair of arm portions 63 formed by upwardly bending both ends of the coupling member 62 as shown in FIG. 10A. Positioning tongue pieces (arc receiving pieces) 64 cut and raised upward are formed on opposed edge parts of the coupling member 62. Each of the arm portions 63 has an inward rib (an arc receiving piece) 65 formed by bending both side edge parts toward the coupling member 62 side and an outward rib (an arc receiving piece) 66. A space is defined between a pair of the outward ribs 66 and 66 for allowing a magnetic flux of the permanent magnet 36 to pass therethrough. The arc shield member 61 has the coupling member 62 mounted on a bottom wall of the magnet holder 35 as shown in FIG. 2 and has the arm portion 63 fixed to opposed side walls of the magnet holder 35 as shown in FIG. 4B.

Figure 8B:
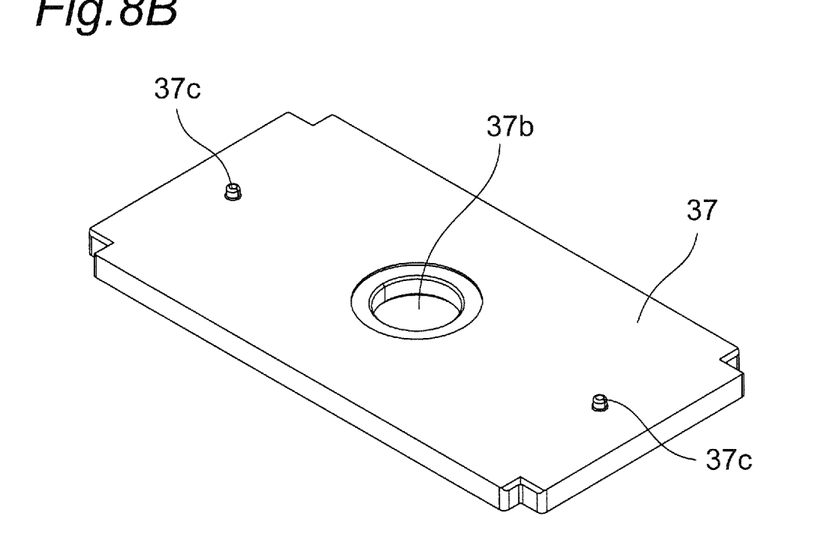

The plate-shaped first yoke 37 takes a planar shape which can be fitted in the opening edge part of the case 10, and has an elastic plate 37a fixed to an upper surface thereof and has a caulking hole 37b provided on a center thereof as shown in FIG. 6. As shown in FIG. 8B, moreover, a positioning projection 37c is provided on both sides of the caulking hole 37b. The plate-shaped first yoke 37 has an upper end of the cylindrical stationary iron core 38 caulked and fixed to the caulking hole 37b, while the ring-shaped projection 32c provided on the ring-shaped flange portion 32a of the metallic cylindrical flange 32 is integrated by resistance welding.

Figure 1A:
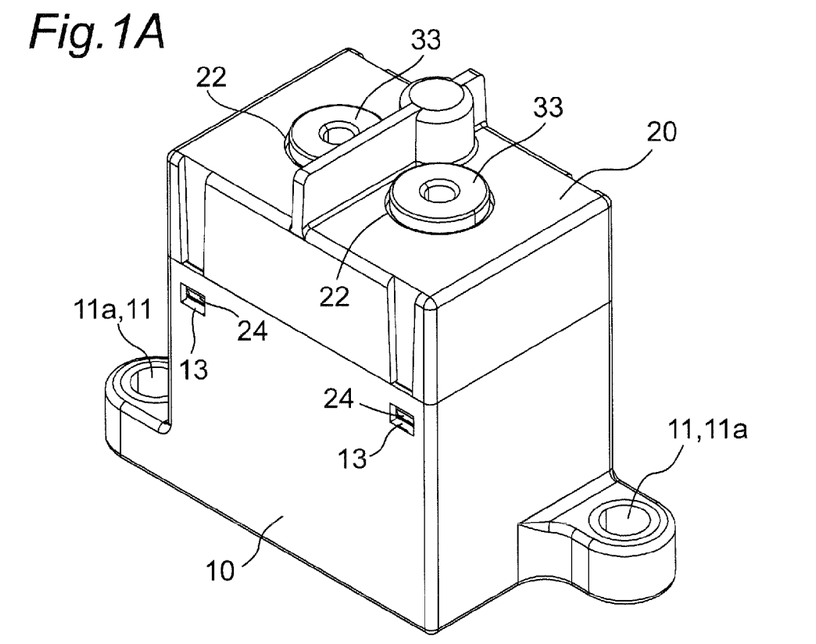
FIGS. 1A and 1B are general perspective views showing a sealed contact device according to one or more embodiments of the present invention as seen at a different angle.
Figure 1B:
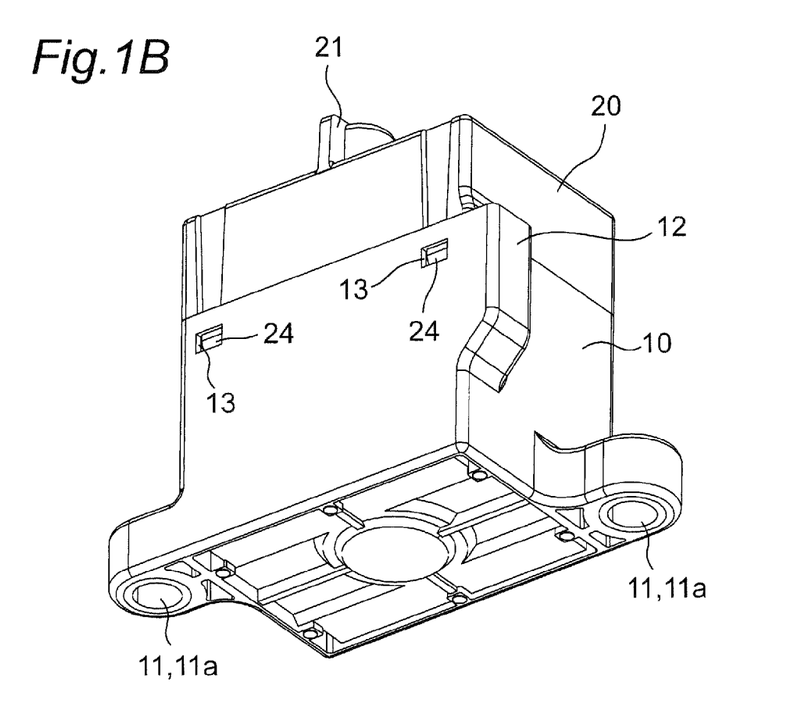
Figure 2:
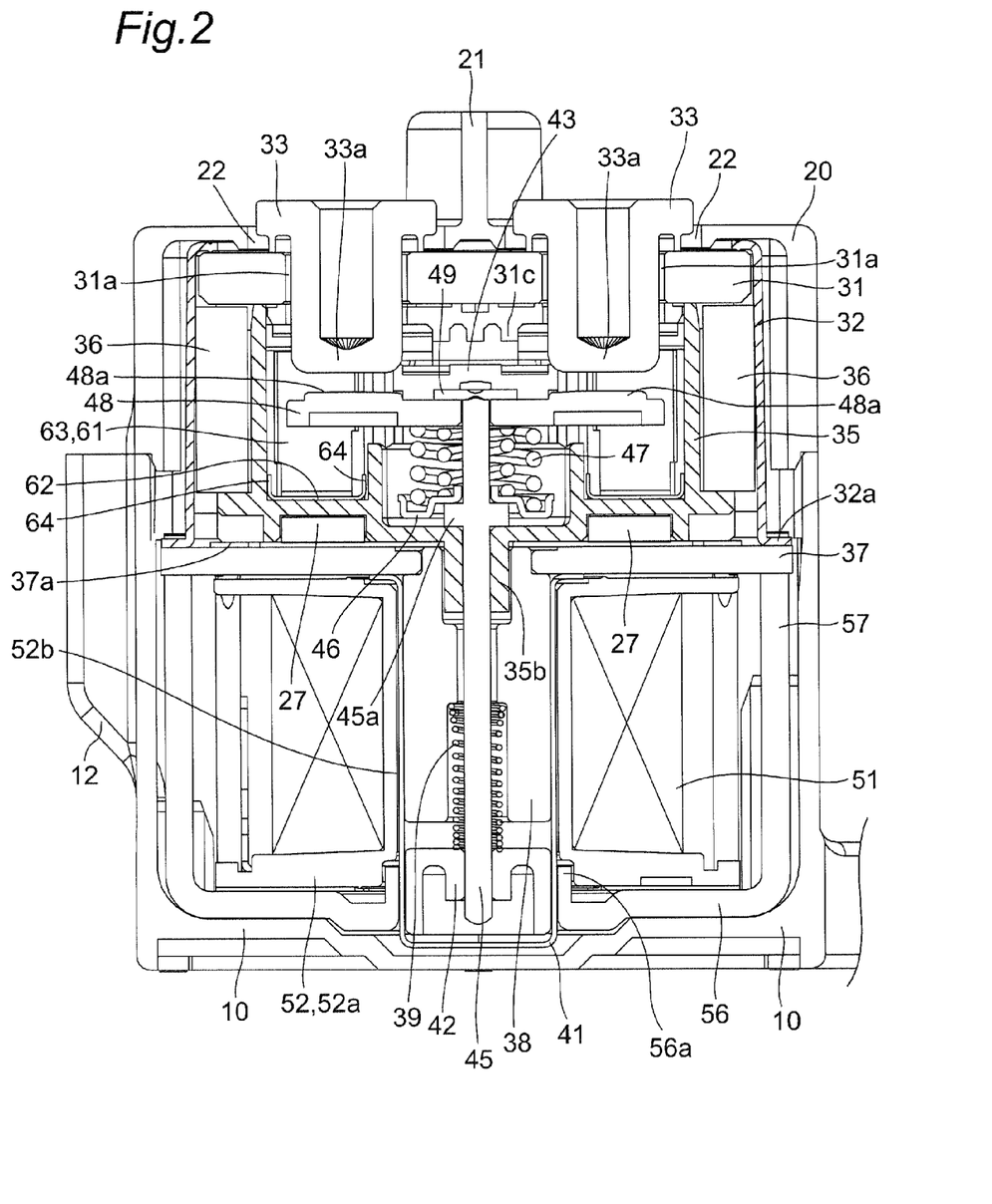
FIG. 2 is a front sectional view showing a state before an operation of the sealed contact device illustrated in FIG. 1 according to one or more embodiments of the present invention.
Figure 3:
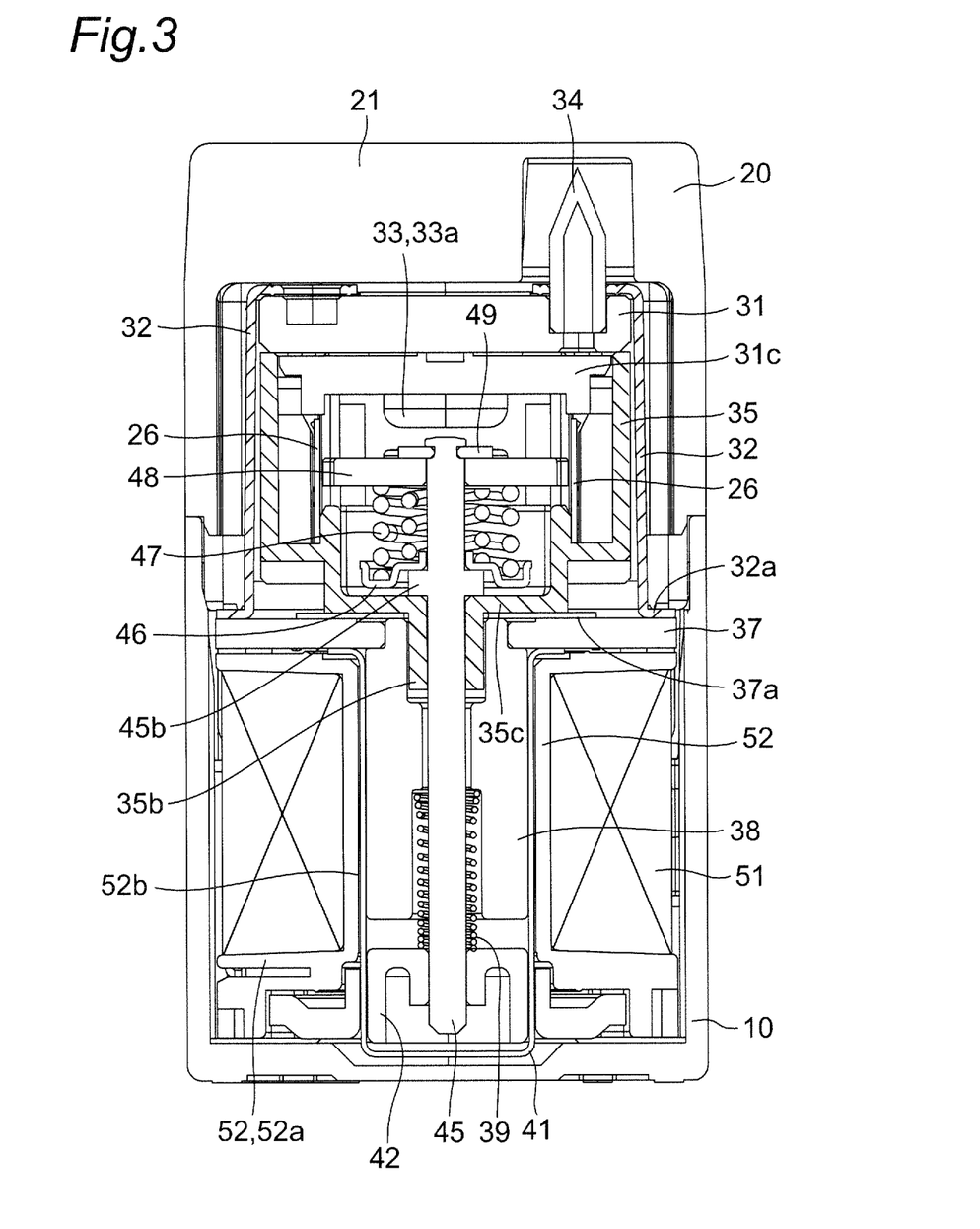
FIG. 3 is a side sectional view showing a state before the operation of the sealed contact device illustrated in FIG. 1 according to one or more embodiments of the present invention.

The cylindrical stationary iron core 38 has a through-hole in which the moving shaft 45 including the ring-shaped flange portion 45a is slidably inserted through the cylindrical insulating portion 35b of the magnet holder 35 as shown in FIG. 2. The moving shaft 45 has a return spring 39 inserted therein and has the moving iron core 42 fixed to a lower end thereof by welding.

The bottom-closed cylindrical member 41 for accommodating the moving iron core 42 has an opening edge part bonded hermetically with a lower surface edge part of the caulking hole 37b provided on the plate-shaped first yoke 37. Internal air is sucked from an evacuating pipe 34 to form the sealed space 43.

As shown in FIG. 2, the moving shaft 45 engages a plate-shaped receiving tool 46 with the ring-shaped or annular flange portion 45a provided in an intermediate part thereof and thus prevents drop out of the inserted contact spring 47 and moving contact piece 48, and fixes a locking ring 49 to an upper end thereof. The moving contacts 48a provided on both ends of the upper surface of the moving contact piece 48 are opposed to the stationary contacts 33a of the stationary contact terminal 33 disposed in the metallic cylindrical flange 32 so as to enable connection/disconnection.

As shown in FIG. 2, the electromagnet portion 50 press fits and fixes coil terminals 53 and 54 to a flange portion 52a of a spool 52 around which a coil 51 is wound, and connects the coil 51 to a lead wire which is not shown through the coil terminals 53 and 54. The bottom-closed cylindrical member 41 is inserted into a through hole 52b of the spool 52 and is fitted in a fitting hole 56a of a second yoke 56. Subsequently, upper ends of both side portions 57 and 57 of the second yoke 56 are engaged with both ends of the plate-shaped first yoke 37 and are thus fixed by means such as caulking, press fitting, welding or the like. Consequently, the electromagnet portion 50 and the contact mechanism portion 30 are integrated with each other.

Next, an operation of the hermetically sealed electromagnetic relay so structured will be described herein.

First of all, in the case in which a voltage is not applied to the coil 51 as shown in FIG. 2, the moving iron core 42 is biased downward by a spring force of the return spring 39, the moving shaft 45 is pushed downward and the moving contact piece 48 is pulled downward. At this time, the ring-shaped flange portion 45a of the moving shaft 45 is engaged with the ring-shaped receiving table 35c of the magnet holder 35, and the moving contact 48a is spaced away from the stationary contact 33a. However, the moving iron core 42 is not in abutment onto the bottom surface of the bottom-closed cylindrical member 41.

Once the coil 51 is applied with a voltage for magnetization, the moving iron core 42 is sucked into the cylindrical stationary iron core 38 so that the moving shaft 45 is slid upward against the spring force of the return spring 39. Also after the moving contacts 48a come in contact with the stationary contacts 33a, the moving shaft 45 is pushed up against the spring forces of the return spring 39 and the contact spring 47, and the upper end of the moving shaft 45 comes up from the shaft hole 48b of the moving contact piece 48 so that the moving iron core 42 contacts with the cylindrical stationary iron core 38.

When the application of the voltage to the coil 51 is cut off for demagnetization, the moving iron core 42 is biased away from the cylindrical stationary iron core 38 based on the spring forces of the contact spring 47 and the return spring 39. For this reason, the moving shaft 45 is slid downward and the moving contacts 48a are disconnected from the stationary contacts 33a. Then, the ring-shaped flange portion 45a of the moving shaft 45 is engaged with the ring-shaped receiving table 35c of the magnet holder 35 and is returned into an original state.

In some cases, an arc may be generated between the stationary contacts 33a having a high voltage and the moving contacts 48a. The arc is induced according to the Fleming's left-hand rule by a current conducting between the stationary contacts 33a and the moving contacts 48a and a magnetic force generated in a horizontal direction between the opposed permanent magnets 36 in FIG. 4A. The arm portion 63 of the arc shield member 61 is disposed in such a direction that the arc is induced. As above, even if the arc is generated in any directions, the arc is first induced/drawn in a desirable direction by the current conducting between the stationary contact 33a and the moving contact 48a and the magnetic force generated in the horizontal direction between the opposed permanent magnets 36. Therefore, the arc can be dissipated through impingement of the arc onto the arc shield member 61.

In particular, the arc shield member 61 has the inward rib 65 and the outward rib 66 with the both side edge parts of the arm portion 63 so as to enclose the generated arc in an efficient manner, thereby dissipating the arc before reaching the magnet holder 35.

Moreover, each of the arc shield members 61 has a cross section in a gate type configuration or a twin-L-shaped configuration (in which a pair of the arc shield members 61 of each having complementary L-shaped sections are arranged so that the outward ribs 66 thereof oppose to each other), and the coupling member (base portion) 62 is mounted on a bottom surface of the magnet holder 35 within the sealed space 43 (the magnet holder 35). This facilitates the arc shield member 61 to be held and access for assembly within the sealed space 43 (the magnet holder 35) when compared with configuration of a simple plate shape thereof. Moreover, this ensures the arc shield member 61 to be seated in the sealed space 43 of the arc shield member 61 without disturbing switching operations of the stationary contacts 33a and the moving contacts 48a.

Furthermore, the arm portions 63 of the arc shield members 61 are disposed to oppose the permanent magnets 36 at both sides of the stationary contacts 33a and the moving contacts 48a. For this reason, even if a direction of the current or the magnetic flux is changed so that a direction of the generation of the arc is varied, the arc can be caused to dissipate by impingement with one of the arm portions 63.

Since the arc shield member 61 is made of a metal, it has a high capability of efficiently cooling the arc impinging onto the arc shield member 61 and thus dissipating the arc.

FIG. 10B shows an arc shield member 61 according to one or more embodiments of the present invention.

The arc shield member 61 according to one or more embodiments has the arm portion 63 provided with the inward rib 65 larger than that of one or more other embodiments. In the case in which the generated arc enters the arm portion 63, the arc can be enclosed and thus dissipated in a more reliable and efficient manner.

Figure 10C:
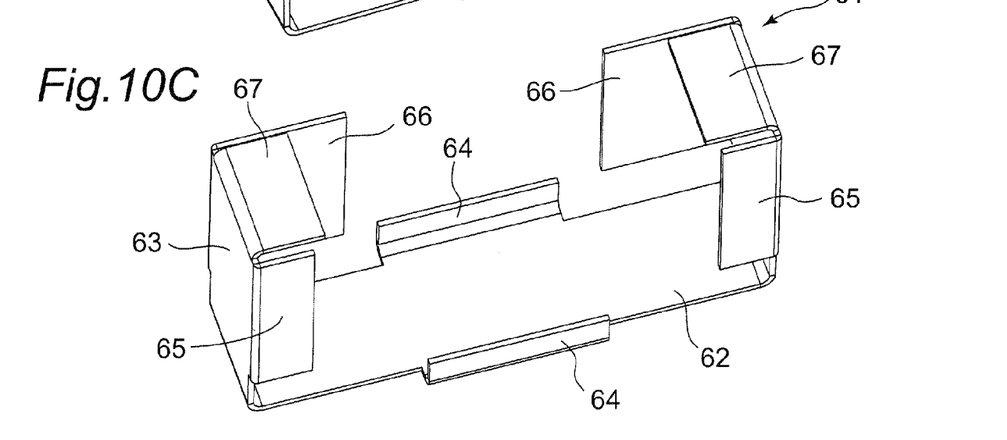

FIG. 10C shows an arc shield member 61 according to one or more embodiments of the present invention.

One or more embodiments are different from one or more other embodiments in view of that each of the arm portions 63 is bent toward the coupling member 62 to form an upper ribs 67 extending therefrom.

According to one or more embodiments, in the case in which a generated arc enters the arm portion 63, the arc can be enclosed and thus dissipated in a more reliable and efficient manner.

Figure 11A:
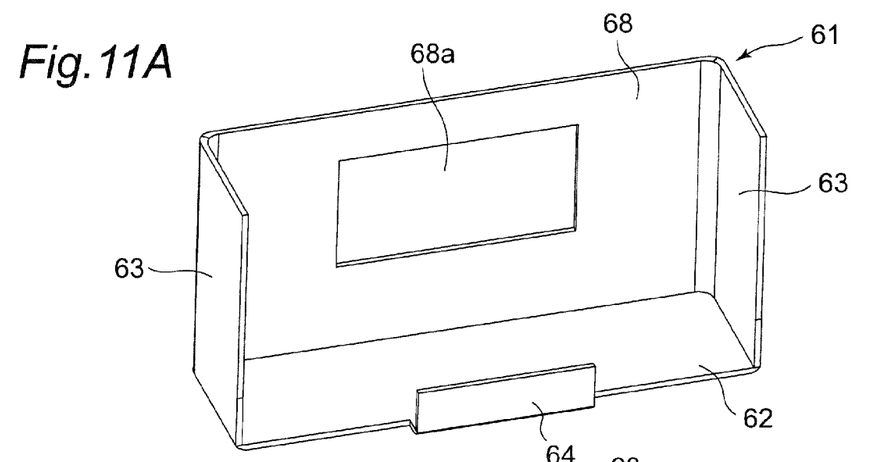
FIGS. 11A, 11B and 11C are perspective views showing shield members for an arc according to one or more embodiments of the present invention.

FIG. 11A shows an arc shield member 61 according to one or more embodiments of the present invention.

One or more embodiments are different from one or more other embodiments in view of that a partition wall 68 is formed to bridge a pair of the arm portions 63 and 63 so that a magnetic flux hole 68a is defined in the partition wall 68, thereby allowing the magnetic flux passing therethrough.

According to one or more embodiments, there is an advantage that it is possible to obtain an arc shield member 61 which has an enhanced mechanical strength and reliably prevents the arc from impinging onto the permanent magnet.

Figure 11B:
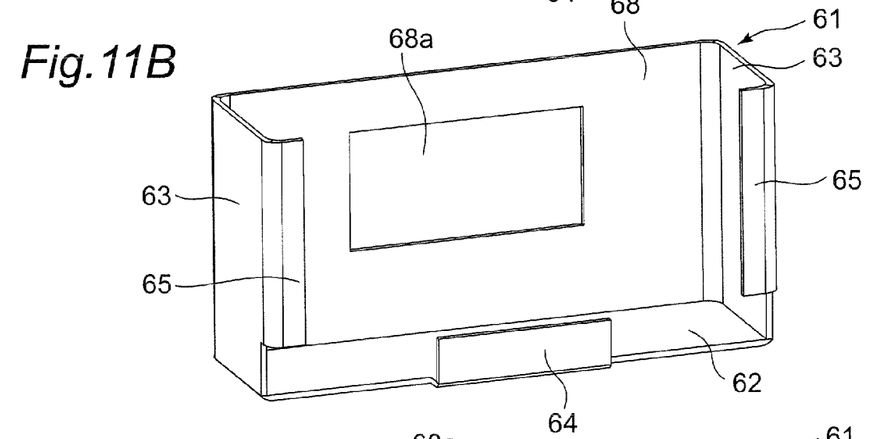
Figure 11C:
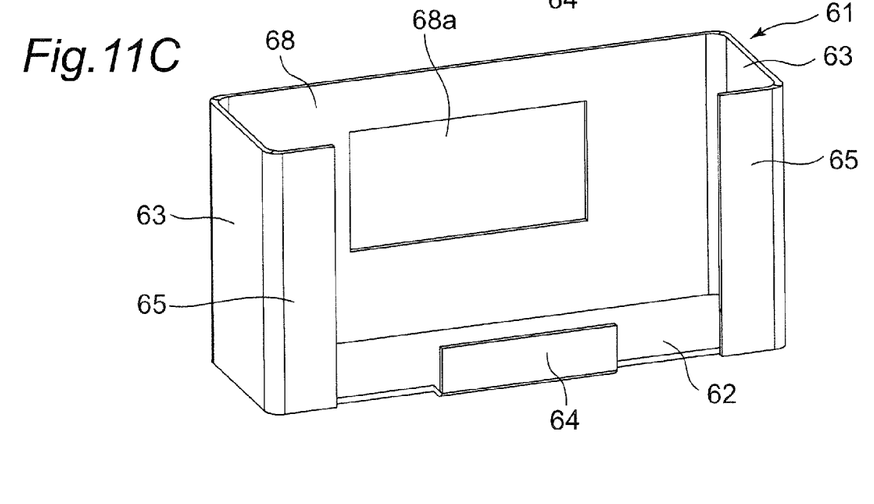

FIGS. 11B and 11C show an arc shield member 61 according to one or more embodiments of the present invention.

The arc shield member 61 according to one or more embodiments includes inward ribs 65 provided on the inward edge parts of the arm portions 63, and the partition wall 68 having the magnetic flux hole 68a at a peripheral end thereof. Also, the arc shield member 61 according to one or more embodiments includes inward ribs 65 provided on the inward edge parts of the arm portions 63, and a partition wall 68 having a magnetic flux hole 68a at a peripheral end thereof. The inward rib 65 reaches the coupling member 62.

One or more embodiments have advantages that a mechanical strength is enhanced and an arc is reliably prevented from impinging onto the permanent magnet.

Figure 12A:
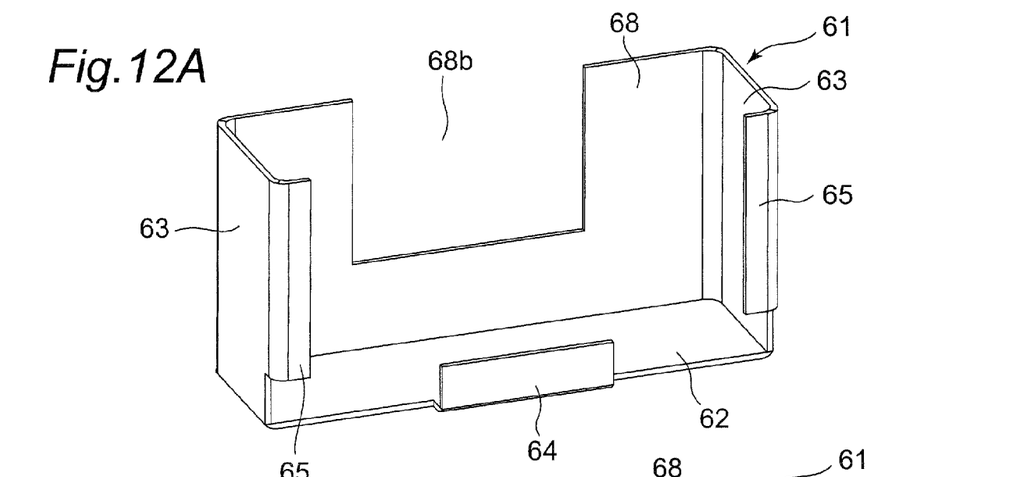
FIGS. 12A, 12B and 12C are perspective views showing shield members for an arc according to one or more embodiments of the present invention.

FIG. 12A shows an arc shield member 61 according to one or more embodiments of the present invention.

The arc shield member 61 according to one or more embodiments includes inward ribs 65 and 65 formed on the inward edge parts of the arm portions 63 and 63, and also the partition wall 68 bridging a pair of the arm portions 63 and 63, which has a cut-out portion 68b over peripheral end thereof.

According to one or more embodiments, the arc shield member 61 can be achieved at high production yield, which enhances mechanical strength and efficiently dissipates an arc.

Figure 12B:
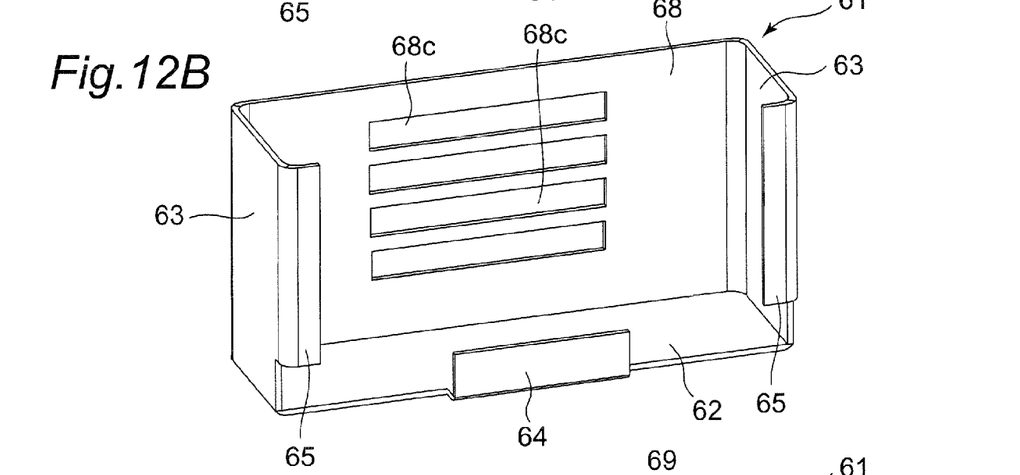

FIG. 12B shows an arc shield member 61 according to one or more embodiments of the present invention.

The arc shield member 61 according to one or more embodiments has inward ribs 65 and 65 formed on inward edge parts of the arm portions 63 and 63, and a partition wall 68 bridging a pair of the arm portions 63 and 63 over the peripheral end thereof, which has a plurality of slits 68c extending in parallel therebetween.

According to one or more embodiments, a magnetic flux of a permanent magnet can pass through the slits 68c provided on the partition wall 68, and furthermore, an arc can be prevented from impinging and dissipated in a reliable manner.

Figure 12C:
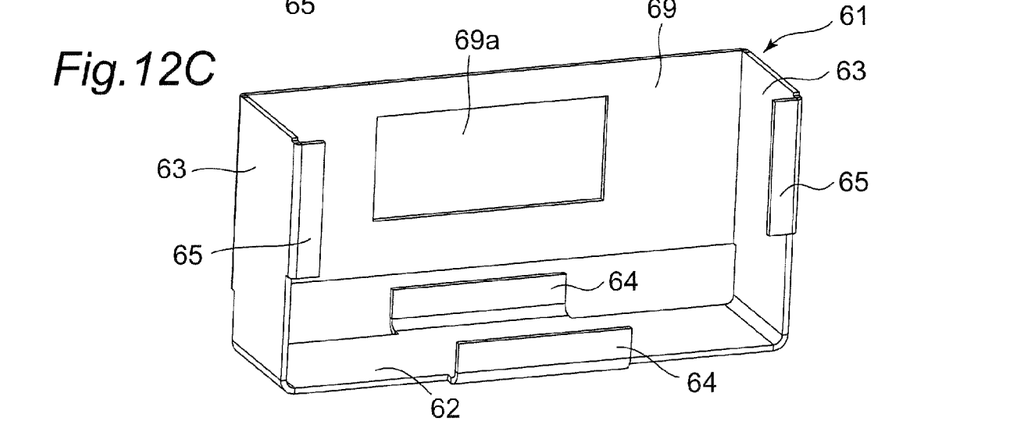

FIG. 12C shows an arc shield member 61 according to one or more embodiments of the present invention.

The arc shield member 61 according to one or more embodiments has inward ribs 65 and 65 formed on inward edge parts of arm portions 63 and 63, and a partition wall 69 bridging a pair of the arm portions 63 and 63 over the peripheral end thereof. The partition wall 69 has a lower end edge part spaced away from the coupling member 62 in such a manner that positioning tongue pieces 64 and 64 can be formed on both peripheral edges of the coupling member 62. The partition wall 69 has a magnetic flux hole 69*a* formed thereon.

According to one or more embodiments, the arc shield member 61 can be achieved at high production yield, which enhances mechanical strength and facilitates alignment or positioning thereof.

A distance between the outward ribs 66 and 66, a width of the magnetic flux holes 68*a* and 69*a*, a width of the cut-out portion 68*b* and a width of the slit 68*c* may be equivalent to or more than at least a diameter of a contact. This facilitates the magnetic flux for drawing an arc to be guided and ensures a desirable attraction force to an arc.

Moreover, height of the magnetic flux holes 68*a* and 69*a* and height of the slit 68*c* may be equivalent to or more than at least a distance between the contacts. Also in the case in which the height of one of the slits 68*c* is smaller than the distance between the contacts, it is sufficient that a sum of the height dimensions of the slits 68*c* is equivalent to or more than the distance between the contacts. The reason is that the passage of a magnetic flux for drawing an arc is to be eased and a desirable drawing force is to be ensured.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

It is a matter of course that the sealed contact device according to the present invention is not limited to the hermetically sealed electromagnetic relay but may also be applied to other electromagnetic switches.

DESCRIPTION OF REFERENCE SYMBOLS

10 CASE (HOUSING)
20 COVER (HOUSING)
32 METALLIC CYLINDRICAL FLANGE
32*a* RING-SHAPED FLANGE PORTION
32*b* CUT-OUT PORTION
32*c* RING-SHAPED PROJECTION
33*a* STATIONARY CONTACT
36 PERMANENT MAGNET
37 PLATE-SHAPED FIRST YOKE
37*a* ELASTIC PLATE
37*b* CAULKING HOLE
37*c* POSITIONING PROJECTION
43 SEALED SPACE
48*a* MOVING CONTACT
61 SHIELD MEMBER FOR ARC
62 COUPLING MEMBER (BASE PORTION)
63 ARM PORTION
64 TONGUE PIECE (ARC RECEIVING PIECE)
65 INWARD RIB (ARC RECEIVING PIECE)
66 OUTWARD RIB (ARC RECEIVING PIECE)
67 UPWARD RIB (ARC RECEIVING PIECE)
68 PARTITION WALL (ARC RECEIVING PIECE)
68*a* MAGNETIC FLUX HOLE
68*b* CUT-OUT PORTION
68*c* SLIT
69 PARTITION WALL (ARC RECEIVING PIECE)
69*a* MAGNETIC FLUX HOLE

The invention claimed is:

1. A sealed contact device in which a ring-shaped flange portion extending laterally from a lower opening edge part of a metallic case is welded and integrated with an upper surface of a plate-shaped yoke to form an internal space and a stationary contact and a moving contact are opposed to each other in the internal space so as to enable approach/separation,
wherein a ring-shaped projection provided along a lower surface of the ring-shaped flange portion is integrated with the upper surface of the plate-shaped yoke by resistance welding.

2. The sealed contact device according to claim 1, wherein the ring-shaped projection is formed by a beating process in two directions.

3. The sealed contact device according to claim 1, wherein the ring-shaped projection is formed by a knocking process.

4. The sealed contact device according to claim 1, wherein the ring-shaped projection which does not come in contact with a cut-out portion disposed on an outer peripheral edge part of the ring-shaped flange portion is provided.

5. The sealed contact device according to claim 4, wherein the ring-shaped projections provided on two adjacent sides of the ring-shaped flange portion are coupled like a circular arc in a region provided with the cut-out portion.

6. The sealed contact device according to claim 1, wherein a surface provided with the ring-shaped projection of the ring-shaped flange portion and a surface on an opposite side have inclination angles of the ring-shaped flange portion to the plate-shaped yoke determined in such a manner that the plate-shaped yoke and the metallic case do not come in contact with each other in a place other than the ring-shaped projection.

7. A method of manufacturing a sealed contact device in which a ring-shaped flange portion extending laterally from a lower opening edge part of a metallic case is welded and integrated with an upper surface of a plate-shaped yoke to form an internal space and a stationary contact and a moving contact are opposed to each other in the internal space so as to enable approach/separation,
wherein a ring-shaped projection provided along a lower surface of the ring-shaped flange portion is integrated with the upper surface of the plate-shaped yoke by resistance welding.

* * * * *